US010528300B2

(12) United States Patent
Sasaki

(10) Patent No.: US 10,528,300 B2
(45) Date of Patent: Jan. 7, 2020

(54) IMAGE PROCESSING SYSTEM, IMAGE PROCESSING METHOD, AND INFORMATION PROCESSING DEVICE

(71) Applicant: KYOCERA Document Solutions Inc., Osaka (JP)

(72) Inventor: Shunsuke Sasaki, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 16/168,226

(22) Filed: Oct. 23, 2018

(65) Prior Publication Data
US 2019/0129657 A1    May 2, 2019

(30) Foreign Application Priority Data
Oct. 27, 2017    (JP) ................. 2017-208507

(51) Int. Cl.
*G06F 3/12*    (2006.01)
*G06K 15/00*    (2006.01)

(52) U.S. Cl.
CPC ............ *G06F 3/121* (2013.01); *G06F 3/1235* (2013.01); *G06F 3/1294* (2013.01); *G06F 3/1296* (2013.01); *G06K 15/4075* (2013.01)

(58) Field of Classification Search
CPC combination set(s) only.
See application file for complete search history.

(56) References Cited

U.S. PATENT DOCUMENTS

| | | | | |
|---|---|---|---|---|
| 2006/0271406 A1* | 11/2006 | Califano | ................ | G06Q 50/22 705/3 |
| 2008/0181628 A1* | 7/2008 | Ahn | ..................... | H04N 1/6022 399/27 |
| 2011/0012953 A1* | 1/2011 | Nakamura | ........... | B41J 2/17513 347/19 |
| 2013/0148160 A1* | 6/2013 | Morimoto | ............. | G06F 3/1296 358/1.15 |

(Continued)

FOREIGN PATENT DOCUMENTS

JP    2016-212437 A    12/2016
JP    2017-094747 A    6/2017

*Primary Examiner* — Helen Zong
(74) *Attorney, Agent, or Firm* — IP Business Solutions, LLC

(57) ABSTRACT

An image processing system comprising an image forming apparatus and an information processing device being connected to the image forming apparatus via a network. In the image forming apparatus, a remaining amount detection section detects a remaining toner amount. A first communication section transmits the remaining toner amount to the information processing device. In the information processing device, a second communication section receives the remaining toner amount transmitted from the image forming apparatus. A control section counts a number of characters included in the document before the transmission of print data, obtains, based on the number of characters and a character-based toner consumption amount per character, a total toner consumption amount of a toner to be consumed for printing the image based on the document, compares the total toner consumption amount with the remaining toner amount, and causes a display section to display results of the comparison.

13 Claims, 7 Drawing Sheets

(56) References Cited

U.S. PATENT DOCUMENTS

| | | | |
|---|---|---|---|
| 2014/0204406 A1* | 7/2014 | Im | G06K 15/4095 |
| | | | 358/1.14 |
| 2014/0293317 A1* | 10/2014 | Xu | H04N 1/00832 |
| | | | 358/1.14 |
| 2017/0180596 A1* | 6/2017 | Sasaki | G05D 1/0027 |

* cited by examiner

IMAGE PROCESSING SYSTEM, IMAGE PROCESSING METHOD, AND INFORMATION PROCESSING DEVICE

INCORPORATION BY REFERENCE

This application claims priority to Japanese Patent Application No. 2017-208507 filed on 27 Oct. 2017, the entire contents of which are incorporated by reference herein.

BACKGROUND

This disclosure relates to an image processing system composed of an image forming apparatus and an information processing device which are connected to each other via a network, and further relates to an image processing method and the information processing device. More specifically, the disclosure relates to a technology for predicting and notifying, for example, toner insufficiency upon document printing performed by the image forming apparatus.

In the image processing system, an image (including, for example, a document, a photo, or a graphic) is transmitted from the information processing device to the image forming apparatus and received from the image forming apparatus by the information processing device via the network and the image is printed onto recording paper by the image forming apparatus. At this point, upon insufficiency of a toner used for the printing on the recording paper in the image forming apparatus, the image can no longer be printed.

Known is a technology in which, in such an image forming apparatus, a toner consumed amount of a toner consumed as a result of execution of a print job is subtracted from a remaining toner amount in a cartridge, and warning is determined in a case where the remaining toner amount obtained as a result of the subtraction reaches a given amount, an alarm indicating that toner lack will occur soon is issued in a case where the remaining toner amount obtained as a result of the subtraction is below the given amount, and an error is determined in a case where the remaining toner amount obtained as a result of the subtraction reaches zero. Also known is a technology of drawing the aforementioned toner consumed amount from relationship between a past number of prints and toner consumed amount.

Also known is a technology of measuring a number of dots upon printing execution, obtaining, as a toner consumed amount, a product of the number of dots and a toner consumed amount per dot, and subtracting the toner consumed amount from the remaining toner amount in the cartridge to predict a remaining toner amount after the printing execution. Also known is a technology of issuing an alarm upon reach of the remaining toner amount in the cartridge at a toner LOW threshold value and further permitting a change in the toner LOW threshold value when given condition is satisfied.

SUMMARY

A technology obtained by further improving the technology described above will be suggested as one aspect of this disclosure.

An image processing system according to one aspect of this disclosure includes an image forming apparatus and an information processing device being connected to the image forming apparatus via a network. The image forming apparatus includes a remaining amount detection section detecting a remaining toner amount of a toner to be used for printing an image on recording paper. The first communication section transmits the remaining toner amount to the information processing device via the network and receives, via the network, print data transmitted from the information processing device. The image formation section prints the image onto the recording paper by use of the print data. The information processing device includes a display section, a second communication section, and a control section. The second communication section receives, via the network, the remaining toner amount transmitted from the image forming apparatus and transmits, to the image forming apparatus via the network, the print data generated from a document. The control section, before the transmission of the print data, counts a number of characters included in the document, obtains, based on the number of characters included in the document and a predetermined character-based toner consumption amount per character, a total toner consumption amount of the toner to be consumed for printing the image based on the document, compares the total toner consumption amount with the remaining toner amount, and causes the display section to display a result of the comparison.

An image processing method according to another aspect of this disclosure includes the steps of: detecting a remaining toner amount of a toner to be used for printing an image on recording paper; counting a number of characters included in a document and obtaining, based on the number of characters included in the document and a predetermined character-based toner consumption amount per character, a total toner consumption amount of the toner to be consumed for printing the image based on the document; and comparing the total toner consumption amount with the remaining toner amount and notifying a result of the comparison.

An information processing device according to still another aspect of this disclosure is connected to an image forming apparatus via a network. The information processing device includes a display section, a second communication section, and a control section. The second communication section receives, via the network, a remaining toner amount transmitted from the image forming apparatus and transmits, to the image forming apparatus via the network, print data generated from a document. The control section, before the transmission of the print data, counts a number of characters included in the document, obtains, based on the number of characters included in the document and a predetermined character-based toner consumption amount per character, a total toner total toner consumption amount of the toner to be consumed for printing the image based on the document, compares the total toner consumption amount with the remaining toner amount, and causes the display section to display a result of the comparison.

DETAILED DESCRIPTION

Hereinafter, an embodiment of this disclosure will be described with reference to the drawings.

Figure 1:
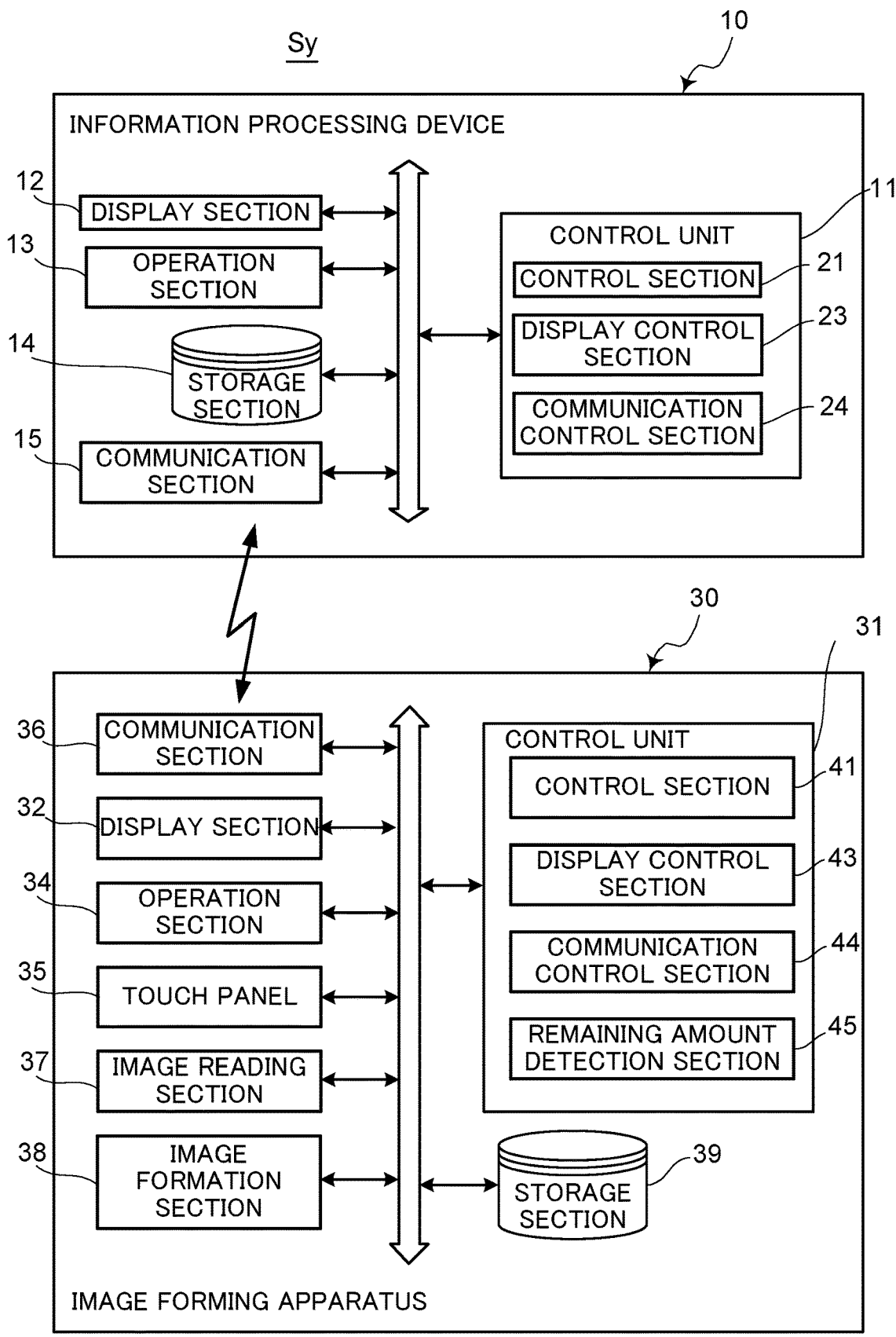
FIG. 1 is a block diagram illustrating configuration of an image forming apparatus and an information processing device in an image processing system according to one embodiment of this disclosure.

FIG. 1 is a block diagram illustrating configuration of an image forming apparatus and an information processing device in an image processing system according to one embodiment of this disclosure.

In an image processing system Sy of this embodiment, an information processing device 10 is, for example, a personal computer and includes: a control unit 11, a display section 12, an operation section 13, a storage section 14, and a communication section 15. These components are capable of mutual data or signal transmission and reception via a bus.

The display section 12 is formed of a liquid crystal display (LCD), an organic light-emitting diode (OLED) display, or the like. The display section 12 corresponds to a "display section" in the scope of the claims.

The operation section 13 is a keyboard or a mouse and is operated by a user whereby, for example, input instructions required for application execution or various pieces of information are inputted. The operation section 13 corresponds to an "operation section" in the scope of the claims.

The storage section 14 is a large-capacity storage device such as a solid state drive (SSD) or a hard disk drive (HDD). The storage section 14 corresponds to a "document storage section" and a "consumption amount storage section" in the scope of the claims.

The communication section 15 is a communication interface including a communication module and performs data communication with an image forming apparatus 30 via a network. The communication section 15 corresponds to a "second communication section" in the scope of the claims.

The control unit 11 is composed of: a processor, a random access memory (RAM), a read only memory (ROM), and so on. The processor is, for example, a central processing unit (CPU), a micro processing unit (MPU), or an application specific integrated circuit (ASIC). The control unit 11 functions as a control section 21, a display control section 23, and a communication control section 24 as a result of execution of a control program stored in the aforementioned ROM or storage section 14 by the aforementioned processor. Note that each of the aforementioned components of the control unit 11 may be formed of a hard circuit without depending on operation based on the control program. The control section 21, the display control section 23, and the communication control section 24 correspond to a "control section" in the scope of the claims.

The control section 21 is in charge of overall operation control of the information processing device 10. The control section 21 also executes applications to perform various types of processing.

The display control section 23 controls the display section 12 to display, for example, a graphical user interface (GUI) on a screen of the display section 12.

The communication control section 24 has a function of controlling communication operation of the communication section 15. The communication section 15 performs data transmission and reception to and from the image forming apparatus 30 under control performed by the communication control section 24.

On the other hand, the image forming apparatus 30 includes: a control unit 31, a display section 32, an operation section 34, a touch panel 35, a communication section 36, an image reading section 37, an image formation section 38, and a storage section 39. These components are capable of mutual data or signal transmission and reception via the bus.

The image reading section 37 is an auto document feeder (ADF) having: a draft conveyance section; and a scanner which optically reads an image of a draft conveyed by the draft conveyance section or an image of a draft loaded on contact glass. The image reading section 37 generates image data indicating a draft image.

The image formation section 38 includes for example: a photosensitive drum; a charging device which uniformly charges a surface of the photosensitive drum; an exposure device which exposes the surface of the photosensitive drum to form an electrostatic latent image on the surface of the photosensitive drum; a developing device which develops, into a toner image, the electrostatic latent image formed on the surface of the photosensitive drum; and a transfer device which transfers, onto recording paper, the toner image (image) formed on the surface of the photosensitive drum. The image formation section 38 prints, onto the recording paper, an image (including, for example, a document, a photo, or a graphic) indicated by image data generated by the image reading section 37 or print data received from the information processing device 10. The image formation section 38 corresponds to an "image formation section" in the scope of the claims.

The display section 32 is formed of, for example, a liquid crystal display (LCD) or an organic light-emitting diode (OLED) display.

A touch panel 35 is arranged on a screen of the display section 32. The touch panel 35 is a touch panel of a so-called resistive film type or a capacitance type). The touch panel 35 detects contact (touch) of a user's finger or the like with the touch panel 35 together with a position of this contact and inputs a user instruction to, for example, the GUI on the screen of the display section 32. Therefore, the touch panel 35 plays a role as an operation section to which user operation on the screen of the display section 32 is inputted.

The operation section 34 includes: for example, a menu key for calling up a menu; arrow keys for moving a focus in the GUI forming the menu; a Determine key for performing confirmation operation on the GUI forming the menu; and a Start key.

The communication section 36 is a communication interface including a communication module and performs data communication with the information processing device 10 via the network. The communication section 36 corresponds to a "first communication section" in the scope of the claims.

The storage section 39 is a large-capacity storage device such as a solid state drive (SSD) or a hard disk drive (HDD) and stores image data and the like.

The control unit 31 is composed of, for example, a processor, a RAM, and a ROM. The processor is, for example, a CPU, an MPU, or an ASIC. The control unit 31 functions as a control section 41, a display control section 43, a communication control section 44, and a remaining amount detection section 45 as a result of execution of an operation control program stored in the aforementioned ROM or storage section 39 by the aforementioned processor. Note that each of the aforementioned components of the control unit 31 may be formed of a hard circuit without depending on the operation based on the operation control program.

The control section 41 is in charge of overall operation control of the image forming apparatus 30.

The display control section 43 controls the display section 32, causing the display section 32 to display, for example, the GUI.

The communication control section 44 has a function of controlling communication operation performed by the communication section 36. The communication section 36 performs data transmission and reception to and from the information processing device 10 via the network under control performed by the communication control section 44.

The remaining amount detection section 45 is connected to, for example, a sensor (not illustrated) which detects a remaining amount in a toner container (not illustrated) which supplies the toner to the developing device of the image formation section 38. The remaining amount detection section 45 receives a detection signal indicating the remaining toner amount from the sensor and detects the remaining toner amount based on the detection signal. The sensor is already known, and examples of the sensor used include: an optical sensor which irradiates light towards the toner in the toner container and detects an amount of reflected light to thereby detect the remaining toner amount; and a piezoelectric element which measures a weight of the toner in the toner container to thereby detect the remaining toner amount. Alternatively, the remaining amount detection section 45 may obtain the toner consumed amount based on a printing rate per recording paper and a printing volume and subtract the toner consumed amount from an initial storage amount of the toner in the toner container to obtain the remaining toner amount. The printing rate here refers to a ratio of a number of pixels forming, for example, a character image with respect to a total number of pixels in a print target image printed on the recording paper.

In the image processing system Sy with the configuration described above, the information processing device 10 and the image forming apparatus 30 can perform data communication with each other in accordance with a known communication protocol.

For example, in the information processing device 10, the user operates the operation section 13 to select a document stored in the storage section 14 and provide an instruction for printing this document, upon which the control section 21 reads the document from the storage section 14 and activates a print driver (application). Then the print driver generates print data indicating the selected document and transmits the print data from the communication section 15 to the image forming apparatus 30 via the communication control section 24. Alternatively, the user operates the operation section 13 to execute a document creation application to create a document and provide an instruction for printing this document, upon which the control section 21 activates the print driver. Then the print driver generates print data indicating the created document and transmits the print data from the communication section 15 to the image forming apparatus 30 via the communication control section 24.

In the image forming apparatus 30, the aforementioned print data is received by the communication section 36 under control performed by the communication control section 44 and is inputted to the control section 41. The control section 41 causes the image formation section 38 to print the print data (forms an image of the print data) on the recording paper.

Moreover, in the image forming apparatus 30, the communication control section 44 causes the communication section 36 to transmit a remaining toner amount TZ detected by the remaining amount detection section 45 towards the information processing device 10.

In the information processing device 10, the remaining toner amount transmitted from the image forming apparatus 30 is received by the communication section 15 under control performed by the communication control section 24 and is inputted to the control section 21. Moreover, before the transmission of the print data indicating this document, the control section 21 counts a number of characters of the document, and based on the number of characters of the document and a character-based toner consumption amount per character, obtains a total toner consumption amount of the toner to be consumed for printing the document. Further, the control section 21 compares the total toner consumption amount with the remaining toner amount to calculate results of the comparison, and the display control section 23 causes the display section 12 to display the calculated comparison results. For example, in a case where the document printing cannot be completed as a result of excess of the total toner consumption amount over the remaining toner amount, the display control section 23 cause the display section 12 to display that the remaining toner amount is insufficient.

Moreover, upon the selection of the document stored in the storage section 14, the control section 21 calculates the total toner consumption amount of the toner consumed for printing the document and further calculates the results of comparison between the total toner consumption amount and the remaining toner amount. The display control section 23 causes the display section 12 to display the comparison results. Alternatively, during the document creation performed by the document creation application, the control section 21 calculates the total toner consumption amount of the toner consumed for printing the document upon every increase in the number of characters of this document and further calculates the results of comparison between the total toner consumption amount and the remaining toner amount, and the display control section 23 causes the display section 12 to display the comparison results.

Figure 2:
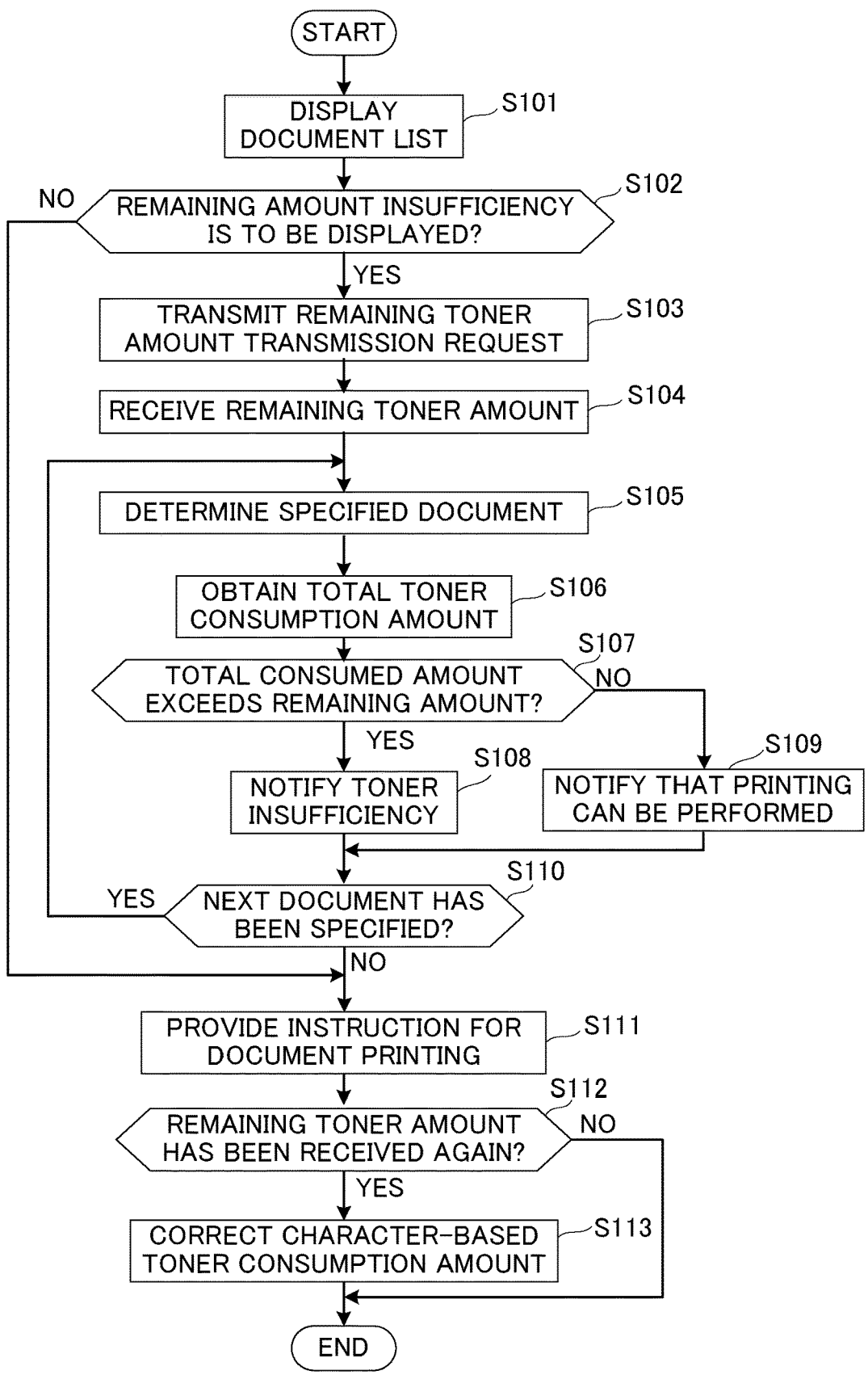
FIG. 2 is a flowchart illustrating processing of notifying results of comparison between a total toner consumption amount and a remaining toner amount upon document selection.

Next, processing of causing the display section 12 to display the results of the comparison between the total toner consumption amount and the remaining toner amount upon the selection of the document stored in the storage section 14 will be described in detail with reference to, for example, a flowchart illustrated in FIG. 2.

Figure 3:
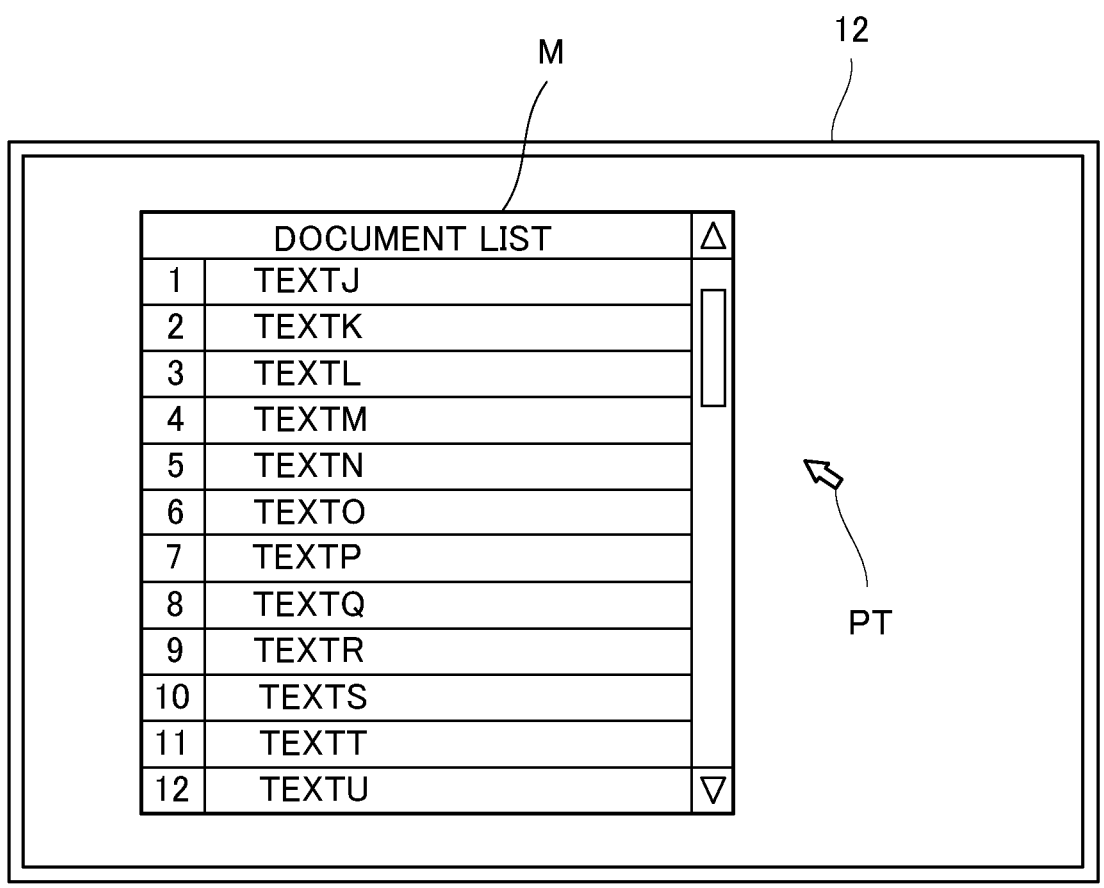
FIG. 3 is a diagram illustrating a list of documents displayed at a display section of the information processing device.

First, the user operates the operation section 13 to provide an instruction for displaying a list of documents stored in the storage section 14, upon which the control section 21 reads out the document stored in the storage section 14 in accordance with the instruction and causes the display section 12 to display, for example, a document list M as illustrated in FIG. 3 via the display control section 23 (step S101). Note that the document list M displays the documents including only characters while excluding photos, graphics, and so on. The documents include only the characters of the same size.

When such a document list M is displayed, based on whether a remaining toner amount display flag FG is ON or OFF, the control section 21 determines whether or not to display the results of the comparison between the total toner consumption amount and the remaining toner amount (step S102).

Figure 4:
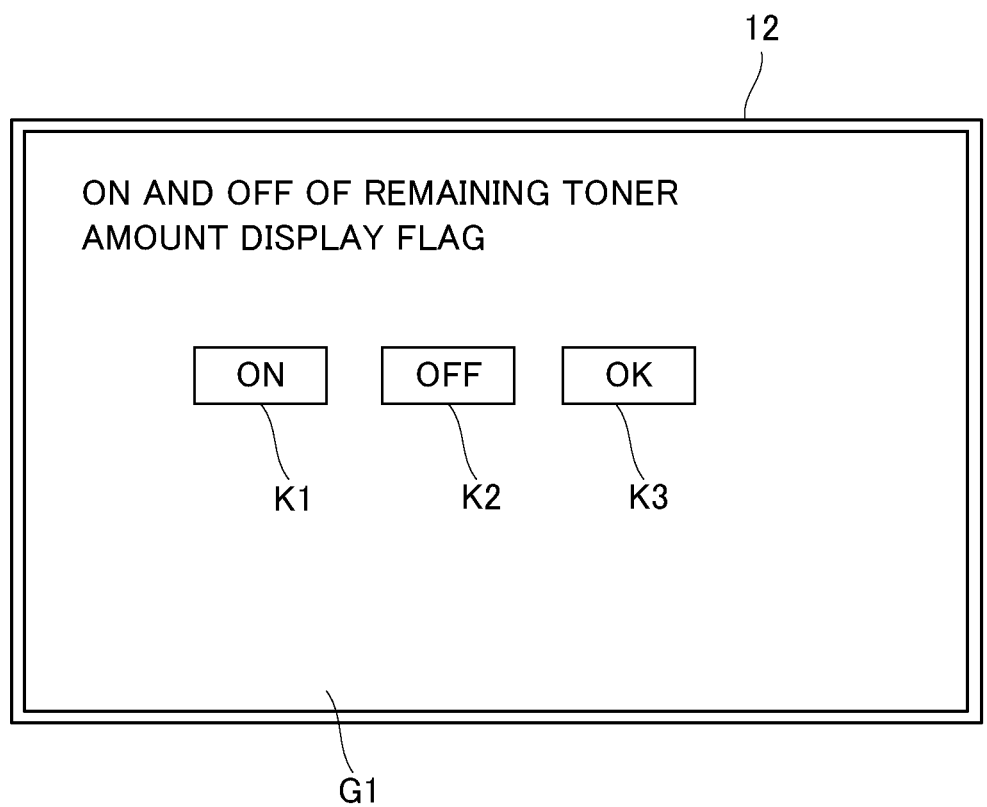
FIG. 4 is a view illustrating a flag setting screen displayed at the display section of the information processing device.

Here, whether the remaining toner amount display flag FG is ON or OFF is previously set. For example, the user operates the operation section 13 to provide an instruction for setting the remaining toner amount display flag FG, upon which the display control section 23 causes the display section 12 to display a flag setting screen G1 as illustrated in FIG. 4 in accordance with the instruction. Displayed on the flag setting screen G1 are: a key K1 for turning the remaining toner amount display flag FG ON; a key K2 for setting OFF; and a key K3 indicating OK. The user operates the operation section 13 to select and specify the key K1 or the key K2 and then specify the key K3, upon which the control section 21 sets the remaining toner amount display flag FG ON or OFF in accordance with the selected key.

For example, when the remaining toner amount display flag FG is ON, the control section 21 determines that the results of the comparison between the total toner consumption amount and the remaining toner amount is to be displayed (YES in step S102) and the communication control section 24 causes transmission of a remaining toner amount transmission request from the communication section 15 to the image forming apparatus 30 (step S103).

In the image forming apparatus 30, the remaining toner amount transmission request is received by the communication section 36 under control performed by the communication control section 44 and is inputted to the control section 41. In accordance with the remaining toner amount transmission request, the control section 41 acquires the remaining toner amount TZ detected by the remaining amount detection section 45 and causes transmission of the remaining toner amount TZ from the communication section 36 to the information processing device 10 under control performed by the communication control section 44.

In the information processing device 10, the remaining toner amount TZ is received at the communication section 15 and inputted to the control section 21 (step S104).

Figure 5A:
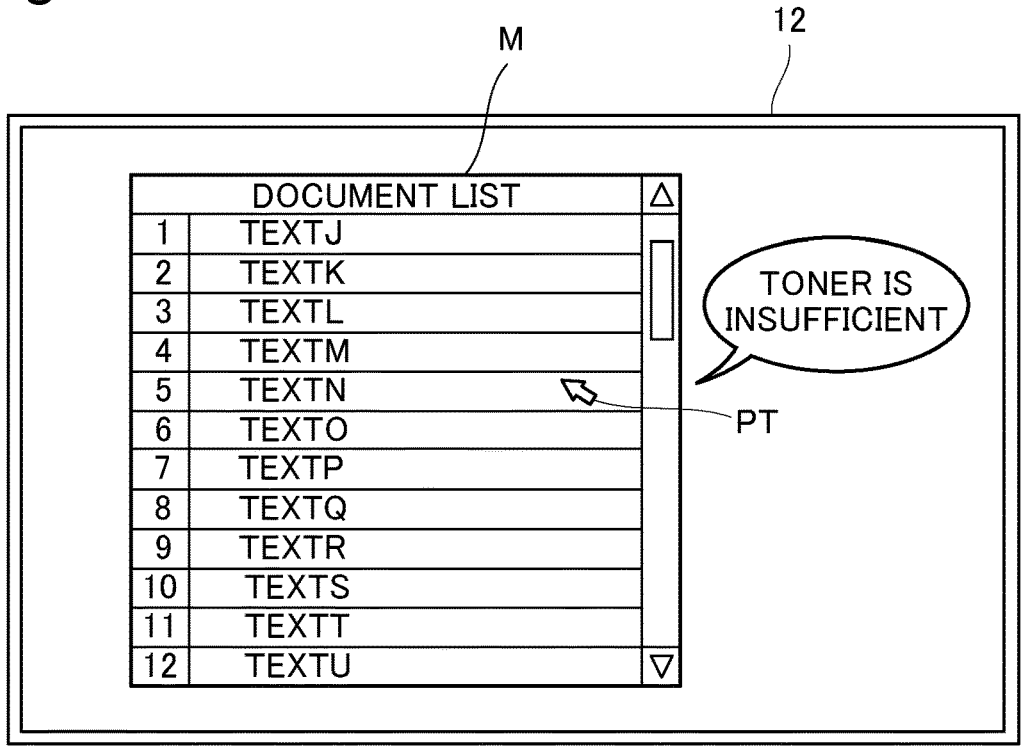
FIG. 5A is a view illustrating a message displayed when any given document in the list of documents has been specified.

Then the user operates the operation section 13 to move, for example, a pointer PT as illustrated in FIG. 5A onto the given document in the document list M on the screen of the display section 12, upon which the control section 21 determines the given document specified by the pointer PT (step S105). Then the control section 21 analyzes this given document, counts and obtains a number of characters N of this document, and obtains, as a total toner consumption amount SR of the toner to be consumed for printing this document, a product of the number of characters N and a character-based toner consumption amount NR per character (step S106).

Subsequently, the control section 21 determines whether or not the total toner consumption amount SR exceeds the remaining toner amount TZ inputted in step S104 (step S107). Upon determination that the total toner consumption amount SR exceeds the remaining toner amount TZ (YES in step S107), the display control section 23 causes the display section 12 to display a message "Toner is insufficient" near the given document specified by the pointer PT as illustrated in FIG. 5A (step S108).

Figure 5B:
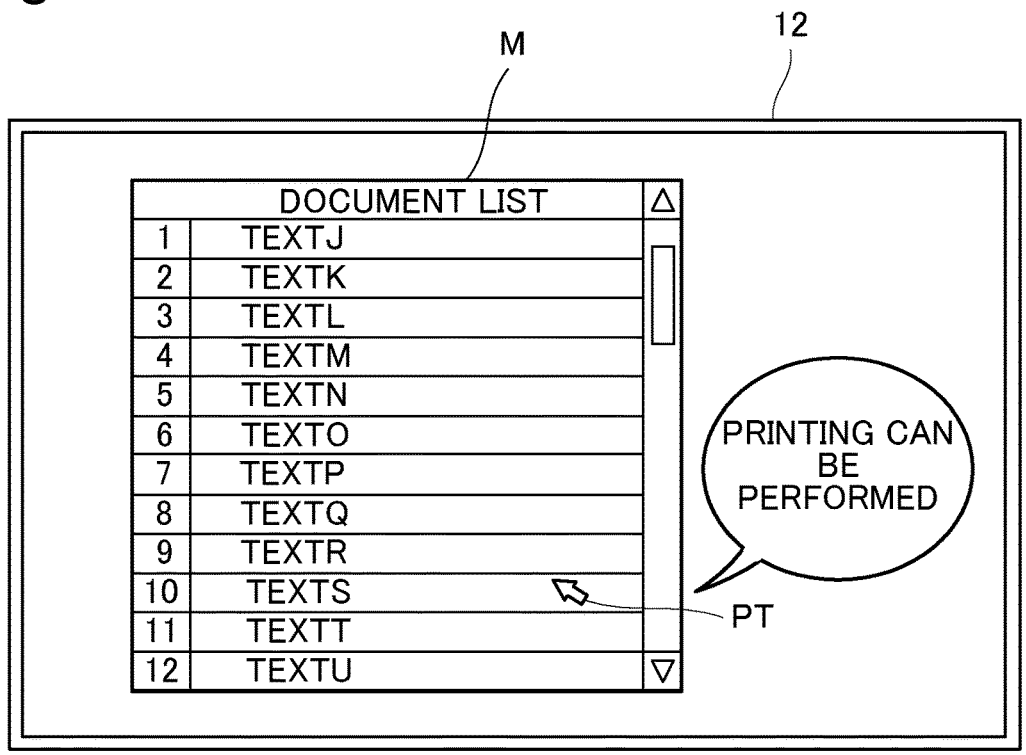
FIG. 5B is a view illustrating another message displayed when any given document in the list of documents has been specified.

Moreover, upon determination that the total toner consumption amount SR does not exceed the remaining toner amount TZ (NO in step S107), the display control section 23 causes the display section 12 to display a message "Printing can be performed" near the given document specified by the pointer PT as illustrated in FIG. 5B (step S109).

Further, the user operates the operation section 13 to move the pointer PT to another given document in the document list M on the screen of the display section 12, upon which the control section 21 determines that there is another given document specified by the pointer PT (YES in step S110) and repeats the processing in steps S105 to S109.

Consequently, in a case where the remaining toner amount TZ is insufficient and printing of another given document cannot be completed, the message "Toner is insufficient" is displayed at the display section 12, and in a case where the remaining toner amount TZ is not insufficient, the message "Printing can be performed" is displayed at the display section 12.

Similarly thereafter, the user operates the operation section 13 to move the pointer PT to another given document on the screen of the display section 12, upon which the message "Toner is insufficient" is displayed at the display section 12 in a case where the remaining toner amount TZ becomes insufficient and printing of the another given document cannot be completed and the message "Printing can be performed" is displayed at the display section 12 in a case where the remaining toner amount TZ is not insufficient.

Moreover, when the remaining toner amount display flag FG is OFF, the control section 21 determines that the results of the comparison between the total toner consumption amount and the remaining toner amount are not to be displayed (NO in step S102) and does not perform the processing in steps S103 to S110 and thus does not display any message.

Then the user operates the operation section 13 to provide an instruction for printing the given document, upon which the control section 21 activates the print driver to cause the print driver to generate print data indicating this document and the communication control section 24 causes transmission of the print data from the communication section 15 to the image forming apparatus 30 (step S111).

In the image forming apparatus 30, the print data is received at the communication section 36 and inputted to the control section 41. The control section 41 analyzes the print data to extract the document, causing the image formation section 38 to form the document on recording paper. Then the control section 41 acquires the remaining toner amount TZ detected by the remaining amount detection section 45 again at this point and the communication control section 44 causes retransmission of the remaining toner amount TZ detected again from the communication section 36 to the information processing device 10.

In the information processing device 10, the remaining toner amount TZ detected again is received at the communication section 15 again and inputted to the control section 21 (YES in step S112). Therefore, the control section 21 has acquired each of the remaining toner amounts TZ detected before and after the document printing. The control section 21 obtains a difference between each of the remaining toner amounts TZ, divides the difference by the aforementioned number of characters N of the document, and calculates an average toner consumed amount HR per character. The control section 21 uses the calculated average toner consumed amount HR to correct and update a character-based toner consumption amount NR per character (step S113).

Moreover, in a case where the answer is NO in step S102, the processing in steps S103 to 110 is not performed, and the remaining toner amount TZ is not received again at the communication section 15 (NO in step S112), the processing in step S113 is not performed and the character-based toner consumption amount NR per character is not updated.

Typically, the toner consumed amount is drawn from relationship between the past number of prints and the toner consumed amount, but due to great variation in the toner consumed amount for different pieces of recording paper, even when the number of prints used for a print job is known, the toner consumed amount cannot accurately be predicted, thus resulting in failure to accurately determine timing of toner insufficiency.

Moreover, in a case where a product of a number of dots and a toner consumed amount per dot is obtained as the toner consumed amount, the toner consumed amount can more accurately be predicted but counting of the number of dots is performed upon printing execution. Thus, before the printing execution, the toner consumed amount and the remaining toner amount cannot be compared with each other to predict whether or not the toner will become insufficient.

In the embodiment described above on the other hand, only by operating the operation section 13 to move the pointer PT to the given document in the document list M on the screen of the display section 12 by the user while the document list M is displayed, in a case where the remaining toner amount TZ is insufficient and the printing of the given document cannot be completed, the message "Toner is insufficient" is displayed at the display section 12, and in a case where the remaining toner amount TZ is not insufficient, the message "Printing can be performed" is displayed at the display section 12.

Moreover, since the character-based toner consumption amount NR per character is corrected based on each of the remaining toner amounts TZ detected before and after the document printing, the character-based toner consumption amount NR can be adjusted in accordance with an actual toner consumed amount in the image forming apparatus 30.

Therefore, with the embodiment described above, the toner consumed amount can accurately be predicted and for example the toner insufficiency can quickly be notified before the printing execution.

Note that when the given document has been specified by the pointer PT, the aforementioned message is displayed at the display section 12 here. Alternatively, a predefined keyword may be included in a name of the document for which this message needs to be displayed and the display control section 23 may cause the display section to display the message when the given document has been specified by the pointer PT and the control section 21 has determined that the predefined keyword is included in the name of the given document. In this case, it is possible to make switching between message display and message non-display, depending on whether or not the predefined keyword is included in the name of the document.

Moreover, upon the specification of the given document by the pointer PT and also upon determination by the control section 21 that the given document is in a noneditable file format (for example, PDF), the display control section 23 may cause the display section 12 to display the message. In this case, switching occurs between message display and message non-display in accordance with the file format of the document.

Further, upon the specification of the given document by the pointer PT and upon determination by the control section 21 that the predefined keyword is included in the name of the given document and the given document is in a noneditable file format, the display control section 23 may cause the display section 12 to display the message.

Figure 6:
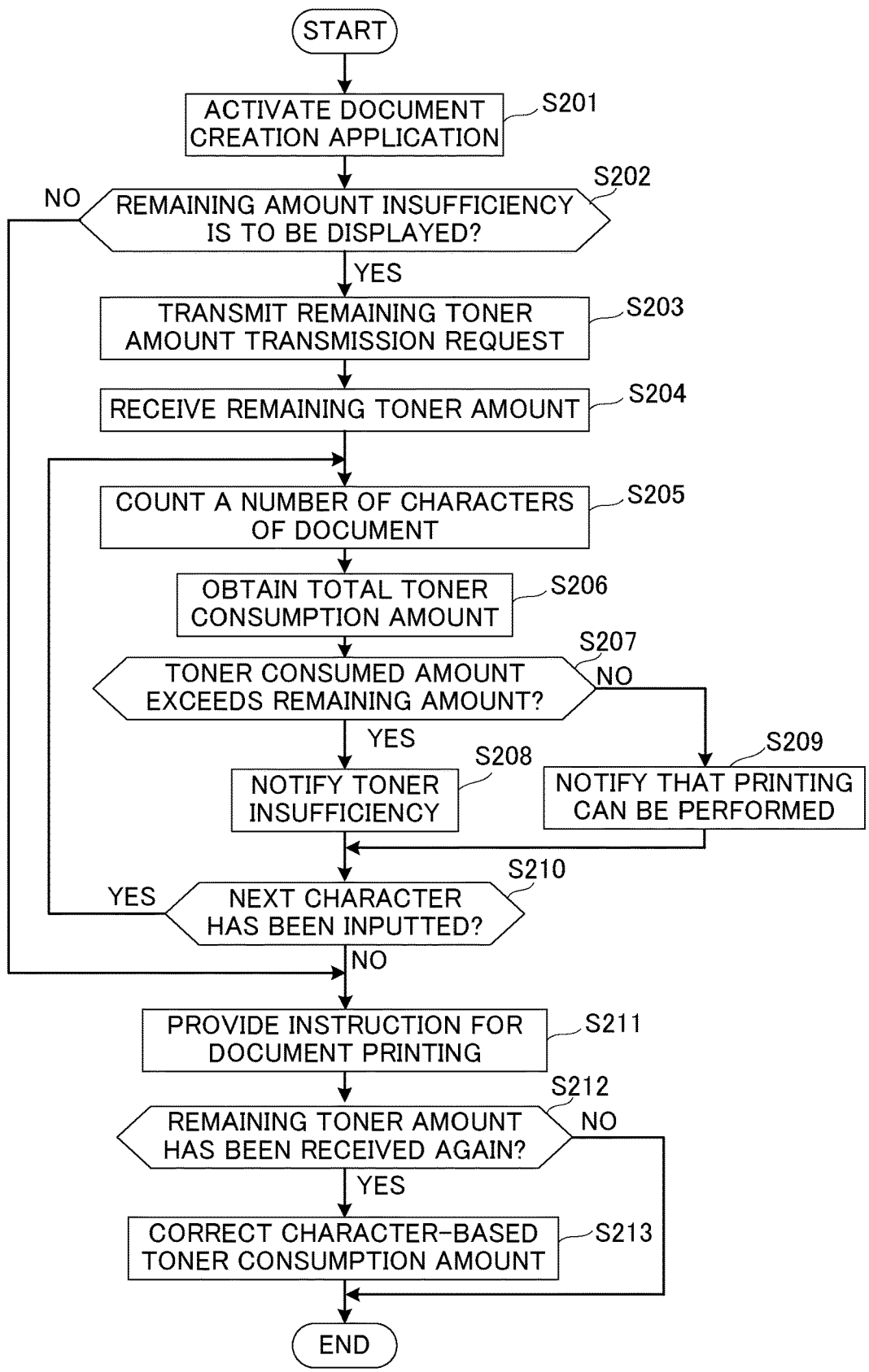
FIG. 6 is a flowchart illustrating procedures of processing for notifying results of comparison between the total toner consumption amount and the remaining toner amount during document creation performed by a document creation application.

Next, processing of notifying the results of the comparison between the total toner consumption amount and the remaining toner amount during the document creation by the document creation application will be described in detail with reference to, for example, a flowchart illustrated in FIG. 6.

First, the user operates the operation section 13 to provide an instruction for activating the document creation application, upon which the control section 21 activates the document creation application (step S201).

Then based on whether the remaining toner amount display flag FG is ON or OFF, the control section 21 determines whether or not the results of the comparison between the total toner consumption amount and the remaining toner amount are to be displayed (step S202). Here, whether the remaining toner amount display flag FG is ON or OFF is preset through operation performed on the flag setting screen G1 as illustrated in FIG. 4.

For example, when the remaining toner amount display flag FG is ON, the control section 21 determines that the results of the comparison between the total toner consumption amount and the remaining toner amount are to be displayed (YES in step S202), and the communication control section 24 causes the communication section 15 to transmit the remaining toner amount transmission request to the image forming apparatus 30 (step S203).

In the image forming apparatus 30, upon reception of the remaining toner amount transmission request at the communication section 36, the communication control section 44 causes transmission of the remaining toner amount TZ obtained by the remaining amount detection section 45 from the communication section 36 towards the information processing device 10.

In the information processing device 10, the remaining toner amount TZ is received at the communication section 15 and inputted to the control section 21 (step S204).

Figure 7A:
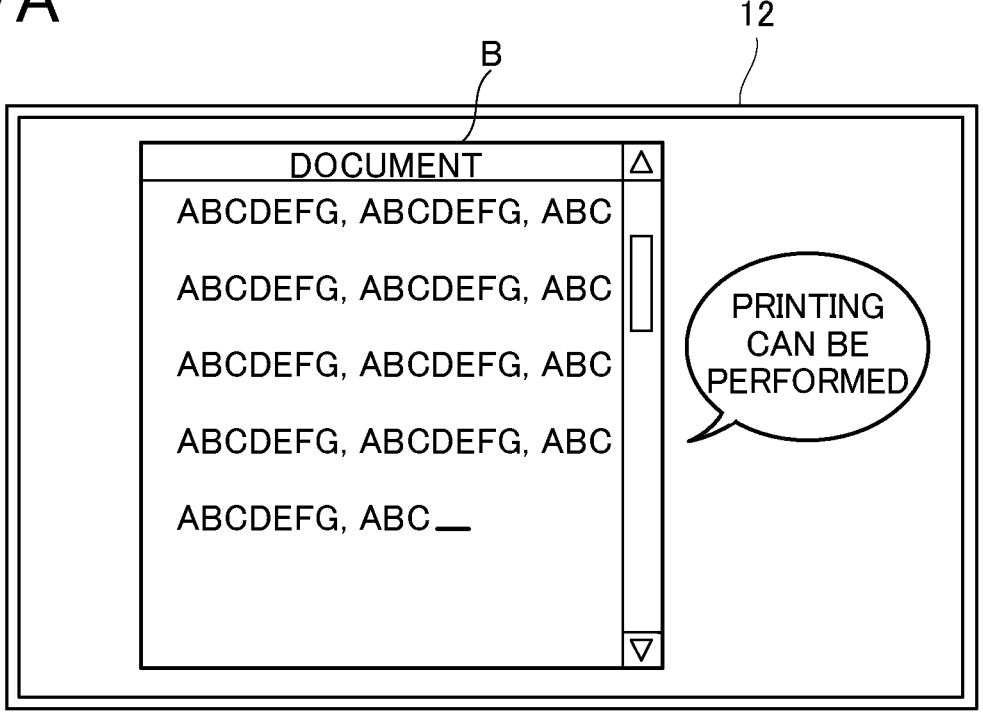
FIG. 7A is a view illustrating a message displayed during the document creation.

Subsequently, the user operates the operation section 13 to proceed the document creation by use of the document creation application, upon which the display control section 23 causes the display section 12 to display a document B as illustrated in FIG. 7A. Moreover, the control section 21 counts a current total number of characters N of the document B including those inputted through the operation of the operation section 13 in a process of creating the document B (step S205), and calculates a product of the number of characters N of the document B and the character-based toner consumption amount NR per character as a total toner consumed amount SR of the toner consumed for printing the document B (step S206).

Then upon determination by the control section 21 that the total toner consumption amount SR does not exceed the remaining toner amount TZ (NO in step S207), the display control section 23 causes the display section 12 to display the message "Printing can be performed" as illustrated in FIG. 7A (step S209).

Figure 7B:
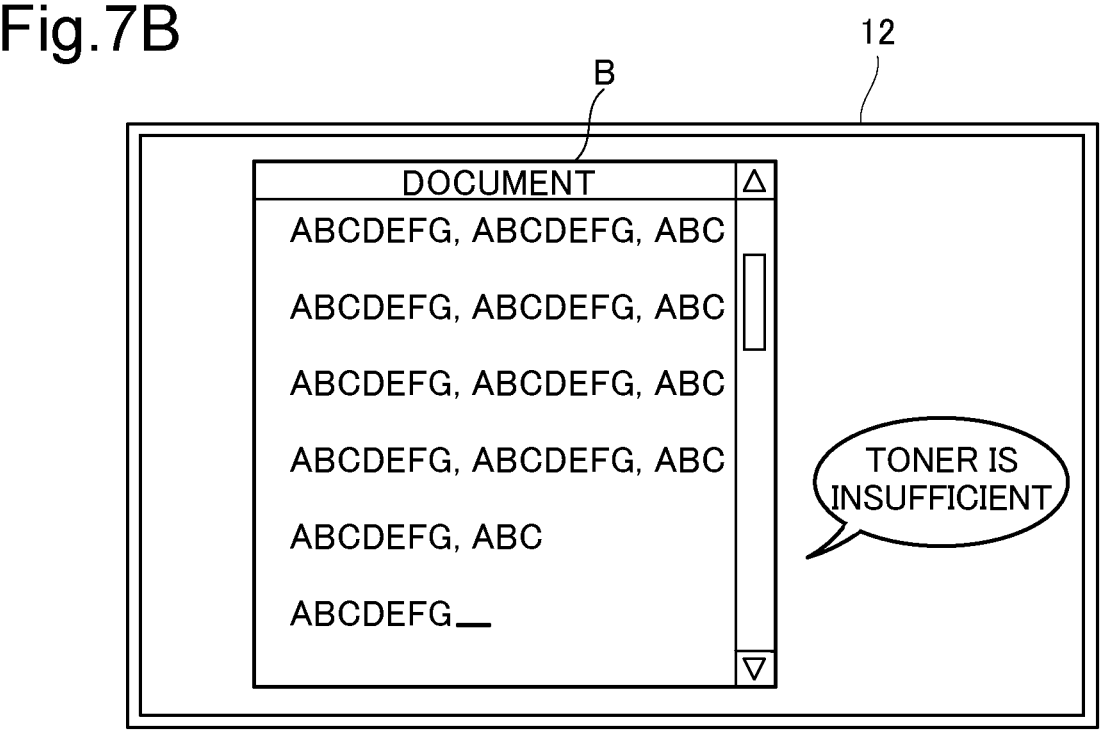
FIG. 7B is a view illustrating another message displayed during the document creation.

Upon determination by the control section 21 that the total toner consumption amount SR exceeds the remaining toner amount TZ (YES in step S207), the display control section 23 causes the display section 12 to display the message "Toner is insufficient" as illustrated in FIG. 7B (step S208).

Further, the user operates the operation section 13 to input the next character, upon which the control section 21, based on the fact that the next character has been inputted (YES in step S210), counts up the number of characters N of the document (step S205) and repeats steps S206 to S209.

Thereafter, upon every input of the next character (YES in step S210), steps S206 to S209 are repeated in a similar manner.

Consequently, every time the number of characters N of the document B is counted up in the process of creating the document B, the total toner consumption amount SR is increased and updated by the character-based toner consumption amount NR per character, and the message "Toner is insufficient" is displayed at timing at which the total toner consumption amount SR exceeds the remaining toner amount TZ following the increase in the number of characters N of the document B.

When the remaining toner amount display flag FG is OFF, the control section 21 determines that the results of the comparison between the total toner consumption amount and the remaining toner amount are not to be displayed (NO in step S202), and does not perform the processing of steps S203 to S210 and therefore the display control section 23 does not cause display of the aforementioned message.

Then the user operates the operation section 13 to provide an instruction for printing the document B created by the document creation application, upon which the control section 21 activates the print driver, causing the print driver to generate print data indicating the document B, and the communication control section 24 causes transmission of the print data from the communication section 15 to the image forming apparatus 30 (step S211).

In the image forming apparatus 30, the print data is received at the communication section 36 and inputted to the control section 41. The control section 41 causes the image formation section 38 to print the print data onto recording paper. Then the control section 41 acquires, again at this point, the remaining toner amount TZ detected by the remaining amount detection section 45, and the communication control section 44 causes transmission of the remaining toner amount TZ from the communication section 36 towards the information processing device 10 again.

In the information processing device 10, the remaining toner amount TZ is received at the communication section 15 again, and the control section 21 acquires the remaining toner amount TZ (YES in step S212). The control section 21 obtains a difference between each of the remaining toner amounts TZ acquired in steps S204 and S212 before and after the document printing and divides this difference by the aforementioned number of characters N of the document to obtain an average toner consumed amount HR per character, and uses the average toner consumed amount HR to correct and update the character-based toner consumption amount NR per character (step S213).

Moreover, in a case where an answer is NO in step S202, the processing in steps S203 to S210 is not performed, and thus the remaining toner amount TZ is not received again at the communication section 15 (NO in step S212), the processing in step S213 is not performed and the character-based toner consumption amount NR per character is not updated.

When the document is created by the document creation application as described above, the number of characters N of the document is sequentially calculated in the process of creating the document, and the total toner consumption amount SR of the toner consumed for printing the document is repeatedly obtained upon every count of the number of characters N, and the display section 12 displays the message "Toner is insufficient" at timing at which the total toner consumption amount SR exceeds the remaining toner amount TZ.

Assumed in the embodiment described above is that a document composed of only characters of the same character size is printed on recording paper, but it is also possible that the document includes characters of a plurality of character sizes. In this case, the control section 21 in the information processing device 10 stores, in the storage section 14, the character-based consumed amount NR for each size in correspondence with each character size. Then the control section 21 counts the number of characters N of the document and also reads out the character-based consumed amounts NR respectively corresponding to the character sizes of the document from the storage section 14, calculates a product of the number of characters N of each size and the read-out character-based consumed amount NR for each size, and calculates a sum of the products calculated for the respective sizes as the total toner consumption amount SR of the toner consumed for printing the document.

Also assumed in the embodiment described above is that the document is printed on the recording paper by use of a toner of a single color, but in a case where a toner of a plurality of colors is used in the image forming apparatus 30, upon insufficiency of a remaining amount of the toner of the single color, the toner of the different color may be used instead to print at least part of the document. In this case, upon determination by the control section 21 of the information processing device 10 that the total toner consumption amount SR exceeds the remaining toner amount TZ, the display control section 23 causes the display section 12 to display a message "Do you print a document by use of a toner of a different color?" together with the message "Toner is insufficient.

Then upon reception of an instruction for using the toner of the different color inputted through operation of the operation section 13, the control section 21 activates the print driver to create print data of the aforementioned single different color based on the document and the communication control section 24 causes transmission of the print data from the communication section 15 to the image forming apparatus 30. In the image forming apparatus 30, the print data is received at the communication section 36 and acquired by the control section 41. The control section 41 causes the image formation section 38 to print the print data.

Moreover, in the embodiment described above, the product of the number of characters N of the document and the character-based toner consumption amount NR is obtained as the total toner consumption amount SR of the toner consumed for printing the document, but in a case where a line is included in the document, the control section 21 may previously store, in the storage section 14, a toner consumed amount for the line corresponding to a length and a thickness of the line, adds, to the total toner consumption amount SR, the toner consumed amount for the line corresponding to the length and the thickness of the line included in the document, and calculate the obtained sum as the total toner consumption amount SR of the toner consumed for the document and line printing. In this case, upon calculation of the average toner consumed amount HR, the control section 21 divides, by the number of characters N of the document, a value obtained by subtracting the toner consumed amount for the line from a difference between each of the toner consumed amounts TZ acquired before and after the document printing to thereby calculate the average toner consumed amount HR per character excluding the line.

Moreover, the configuration and the processing of the embodiment described above with reference to FIGS. 1 through 7B form just one embodiment of this disclosure, and this disclosure is not limited to these configuration and processing.

While the present disclosure has been described in detail with reference to the embodiments thereof, it would be apparent to those skilled in the art the various changes and modifications may be made therein within the scope defined by the appended claims.

What is claimed is:

1. An image processing system comprising an image forming apparatus and an information processing device being connected to the image forming apparatus via a network, wherein
the image forming apparatus includes:
a remaining amount detection section detecting a remaining toner amount of a toner to be used for printing an image on recording paper;
a first communication section transmitting the remaining toner amount to the information processing device via the network and receiving, via the network, print data transmitted from the information processing device; and
an image formation section printing the image onto the recording paper by use of the print data, and
the information processing device includes:
a display section;
a second communication section receiving, via the network, the remaining toner amount transmitted from the image forming apparatus and transmitting, to the image forming apparatus via the network, the print data generated from a document; and
a control section, before the transmission of the print data, counting a number of characters included in the document, obtaining, based on the number of characters included in the document and a predetermined character-based toner consumption amount per character, a total toner consumption amount of the toner to be consumed for printing the image based on the document, comparing the total toner consumption amount with the remaining toner amount, and causing the display section to display a result of the comparison,
in the image forming apparatus, the remaining amount detection section respectively detects a first remaining toner amount remaining before printing the image based on the document and a second remaining toner amount remaining after printing the image based on the document, and the first communication section transmits the first and second remaining toner amounts to the information processing device via a network, and
in the information processing device, upon reception of the first and second remaining toner amounts at the second communication section, the control section obtains a difference between the first and second remaining toner amounts and divides the difference between the first and second remaining toner amounts by the number of characters included in the document to obtain an average toner consumed amount per character, and corrects and updates the character-based toner consumption amount based on the average toner consumed amount.

2. The image processing system according to claim 1, wherein
the control section of the information processing device obtains the average toner consumed amount per character for each character size and corrects the character-based consumption amount for the each character size.

3. The image processing system according to claim 2, wherein
the information processing device further includes a consumption amount storage section storing respective character-based toner consumption amounts in correspondence with a plurality of character sizes, and
the control section counts the number of characters included in the document and also reads out, from the consumption amount storage section, the character-based toner consumption amount corresponding to the character size of the character included in the document, and based on the number of characters and the character-based toner consumption amount having been read out, obtains a total toner consumption amount of the toner to be consumed for printing the image based on the document.

4. The image processing system according to claim 1, wherein
the information processing device further includes: a document storage section storing the document; and an operation section operated by a user; and
at timing at which the document stored in the document storage section has been selected through operation of the operation section, the control section of the information processing device obtains the total toner consumption amount of the toner to be consumed for printing the image based on the document on the recording paper, compares the total toner consumption amount with the remaining toner amount, and causes the display section to display the result of the comparison.

5. The image processing system according to claim 4, wherein
in a case where the document stored in the document storage section has been selected and a preset keyword is given to a name of the document, the control section of the information processing device obtains, at timing at which the document has been selected, the total toner consumption amount of the toner to be consumed for printing the image based on the document on the recording paper, compares the total toner consumption amount with the remaining toner amount, and causes the display section to display the result of the comparison.

6. The image processing system according to claim 1, wherein
the information processing device further includes an operation section operated by a user, and
the control section of the information processing device executes a document creation application in accordance with the operation of the operation section to create a document, sequentially counts a number of characters included in the document in a process of creating the document, obtains, upon every counting of the number of characters, based on the number of characters included in the document and the character-based toner consumption amount per character, the total toner consumption amount of the toner to be consumed for printing the image based on the document, compares the total toner consumption amount with the remaining toner amount, and causes the display section to display the result of the comparison.

7. The image processing system according to claim 1, wherein
the information processing device further includes an operation section operated by a user, and in a case where the total toner consumption amount exceeds the remaining toner amount, the control section of the information processing device causes the display section to display that the toner is insufficient and also causes the display section to display that it is prompted to use a toner of a color different from a color of the toner to be consumed for printing the image based on the document on the recording paper, when an instruction for using the toner of the different color has been provided through the operation of the operation section, generates, based on the document, different print data for printing by use of the toner of the different color, and causes the second communication section to transmit the generated different print data to the image forming apparatus via the network, and in the image forming apparatus, upon reception of the different print data at the first communication section, the image formation section prints an image on the recording paper by use of the different print data.

8. The image processing system according to claim 1, wherein the information processing device further includes an operation section operated by a user, and the control section of the information processing device switches between display and non-display of the result of the comparison by the display section in accordance with the operation of the operation section.

9. The image processing system according to claim 8, wherein in a case where an instruction for displaying the result of the comparison has been provided through the operation of the operation section, the control section causes the display section to display the result of the comparison, and in a case where the instructions for displaying the result of the comparison has not been provided through the operation of the operation section, the control section causes the display section not to display the result of the comparison.

10. The image processing system according to claim 1, wherein in a case where the total toner consumption amount exceeds the remaining toner amount, the control section causes the display section to display that the toner is insufficient, and in a case where the total toner consumption amount does not exceed the remaining toner amount, the control section causes the display section to display that the document can be printed.

11. The image processing system according to claim 4, wherein in a case where the document stored in the document storage section has been selected and the document is in a non-editable file format, at timing at which the document has been selected, the control section obtains the total toner consumption amount of the toner to be consumed for printing the image based on the document on the recording paper, compares the total toner consumption amount with the remaining toner amount, and causes the display section to display the results of the comparison.

12. An image processing method comprising the steps of:

detecting a remaining toner amount of a toner to be used for printing an image on recording paper;

counting a number of characters included in a document and obtaining, based on the number of characters included in the document and a predetermined character-based toner consumption amount per character, a total toner consumption amount of the toner to be consumed for printing the image based on the document;

comparing the total toner consumption amount with the remaining toner amount and notifying a result of the comparison;

respectively detecting a first remaining toner amount remaining before printing the image based on the document and a second remaining toner amount remaining after printing the image based on the document; and obtaining a difference between the first and second remaining toner amounts and dividing the difference between the first and second remaining toner amounts by the number of characters included in the document to obtain an average toner consumed amount per character, and based on the average toner consumed amount, correcting and updating the character-based toner consumption amount.

13. An information processing device being connected to an image forming apparatus via a network, the information processing device comprising:

a display section;

a second communication section receiving, via the network, a remaining toner amount transmitted from the image forming apparatus and transmitting, to the image forming apparatus via the network, print data generated from a document; and a control section, before the transmission of the print data, counting a number of characters included in the document, obtaining, based on the number of characters included in the document and a predetermined character-based toner consumption amount per character, a total toner consumption amount of the toner to be consumed for printing the image based on the document, comparing the total toner consumption amount with the remaining toner amount, and causing the display section to display a result of the comparison, wherein upon reception, by the second communication section, of a first remaining toner amount remaining before printing the image based on the document and a second remaining toner amount remaining after printing the image based on the document, which are transmitted from the image forming apparatus, the control section obtains a difference between the first and second remaining toner amounts and divides the difference between the first and second remaining toner amounts by the number of characters included in the document to obtain an average toner consumed amount per character, and corrects and updates the character-based toner consumption amount based on the average toner consumed amount.

* * * * *